US005378005A

United States Patent [19]
Norton

[11] Patent Number: 5,378,005
[45] Date of Patent: Jan. 3, 1995

[54] PORTABLE TOOL TRUCK WITH DIVERSE TOOL ORGANIZATIONAL CAPABILITY

[76] Inventor: George W. Norton, 306 Dennis Ave., Silver Spring, Md. 20901

[21] Appl. No.: 959,099

[22] Filed: Oct. 9, 1992

[51] Int. Cl.[6] .................. B62B 1/04

[52] U.S. Cl. .................. 280/47.26; 280/652; 280/47.28; 206/349

[58] Field of Search .................. 280/47.24, 47.26, 47.28, 280/651, 652, 47.19, 659, 47.18, 47.17, 79.2, 63, 79.3; 312/244, 293.1, 902; 206/349

[56] References Cited

U.S. PATENT DOCUMENTS

| | | | |
|---|---|---|---|
| 1,496,216 | 6/1921 | Groth . | |
| 1,932,045 | 1/1932 | Olson . | |
| 2,883,731 | 2/1958 | Wells . | |
| 2,893,749 | 10/1956 | Simonsen . | |
| 2,905,480 | 8/1957 | Giovannelli . | |
| 2,964,328 | 2/1959 | Muir | 280/47.17 |
| 3,089,745 | 12/1960 | Postula et al. | 312/324 |
| 3,118,685 | 7/1961 | Jordan | 280/47.19 |
| 3,429,633 | 8/1966 | Flatt | 312/324 |
| 4,281,843 | 8/1981 | Johnson et al. | 280/47.26 |
| 4,285,556 | 8/1981 | Loeffel | 312/244 |
| 4,378,828 | 4/1983 | Shiminski | 144/285 |
| 4,989,291 | 2/1991 | Parent | 15/315 |
| 5,152,441 | 10/1992 | Torena | 312/902 |
| 5,213,351 | 5/1993 | Chen | 280/47.26 |

*Primary Examiner*—Richard M. Camby
*Attorney, Agent, or Firm*—Hoffman, Wasson & Gitler

[57] ABSTRACT

A portable tool truck comprising a molded plastic body with a compartment formed in the front face of the body and adapted to retain tools therein. A first door is mounted at one side of the body, and a second door is mounted at the opposite side of the body. The doors pivot in opposite directions into an overlapping arrangement that seals off the compartment. Numerous tool storage pockets, slots, and apertures are defined in the truck body, and in the interior faces of both doors, to retain a plethora of diverse tools therein. Plastic crates, for retaining power tools, may be secured to guideways on the front face of the forward door.

4 Claims, 7 Drawing Sheets

PORTABLE TOOL TRUCK WITH DIVERSE TOOL ORGANIZATIONAL CAPABILITY

BACKGROUND OF THE INVENTION

This invention relates generally to portable tool trucks that may readily be transported to a work site. More specifically, the invention pertains to a portable tool truck that has increased organizational capacity to store, in readily accessible fashion, diverse tools used by craftsman, such as carpenters, electricians, plumbers, etc. on a work site.

Portable tool trucks are known in the prior art, and have been used with varying degrees of acceptance, for many years. Conventional tool trucks are shown in U.S. Pat. No. 2,964,328, granted to David L. Muir, and U.S. Pat. No. 4,281,843, granted to Frank Johnson et al.

Muir discloses a tool cart having a vertically extending body supported on wheels 36, 38 that are rotatably attached to an axle 40 extending between journal plates at the rear of the body. A pair of doors 46, 48 are arranged in edge to edge relationship, and pivot outwardly about spaced vertical axes, to provide access to compartment 24 defined within the interior of the body. Hand tools 116 are retained by hooks 108 within the compartment, and tray 54 extends transversely between the opened doors, as shown in FIG. 2. Platform 74 assists in retaining the tool cart in its vertical orientation.

Johnson discloses a tool carrier having a molding plastic tray 14 and a second tool receptacle 18 mounted on a frame which is made up of a pair of essentially reverse Z-shaped members 20 joined at the top by a transverse handle 26 and having, at the bottom, a short vertical leg 36. A transverse member 28 joins the vertical legs 36. Tool handle gripping members 16 and hooks 134, for storing electrical cords, further increase the tool carrying capacity of the tool truck disclosed in Johnson et al.

Other portable tool trucks are disclosed in U.S. Pat. No. 2,893,749, granted to E. H. Simonsen; U.S. Pat. No. 2,905,480, granted to R. R. Giovannelli; and U.S. Pat. No. 3,118,685, granted to Jordan.

However, the tool carrying capability of known portable tool trucks is limited, and the security provisions for protecting the tools from theft are readily defeated. Furthermore, the organizational capability of known portable tool trucks is limited. Thus, the need for a portable, secure, large capacity, versatile tool truck, with significant organizational capability, that can be utilized by diverse craftsmen, remains unsatisfied.

SUMMARY OF THE INVENTION

In order to satisfy the foregoing criteria, applicant has devised a portable tool truck that employs a pair of overlapping doors at the front of the tool truck. Each door is independently mounted upon a vertical shaft at one side of the body of the truck; the doors pivot in opposite directions to control access to the interior of the tool truck.

The interior face of each door is configured to receive diverse tools, and each door extends across the width of the body of the tool truck. The increased size of the doors increases the capacity of the tool truck. The doors, when overlapped in the closed position, are locked to increase the security of the tools contained therein.

Molded guideways are defined on the outer face of the forward door to receive molded plastic crates therein; the crates can carry power tools to the job site, and can then be removed from the guideways. The present portable tool carrier thus enables the craftsman to organize, and then readily transport, diverse tools and accessories to a job site.

The present portable tool carrier employs a large, unitary body, and cooperating doors, that may be molded from a suitable plastic, thereby enhancing its strength, while facilitating the assembly of the tool truck, and lowering its prospective cost to increase consumer acceptance.

A first handle is centrally located at the midpoint of the back surface of the present portable tool cart, near its upper end, and a second handle is offset, at an angle, on the bottom surface of the cart. The first handle enables the user to tilt the cart about the rear axle retaining the wheels for the portable tool truck, and to then pull the cart behind him. The second handle serves as a rest for stabilizing the tool truck in its vertical orientation; when the portable truck is to be transported to the job site, the tool chest is canted out of its vertical orientation; and a second person may use the handle to guide the tool truck during its movement.

Yet additional advantages which flow from the unique configuration of the present portable tool truck will become apparent from the appended drawings, when construed in harmony with the specification.

DETAILED DESCRIPTION OF THE PREFERRED EMBODIMENT

Figure 1:
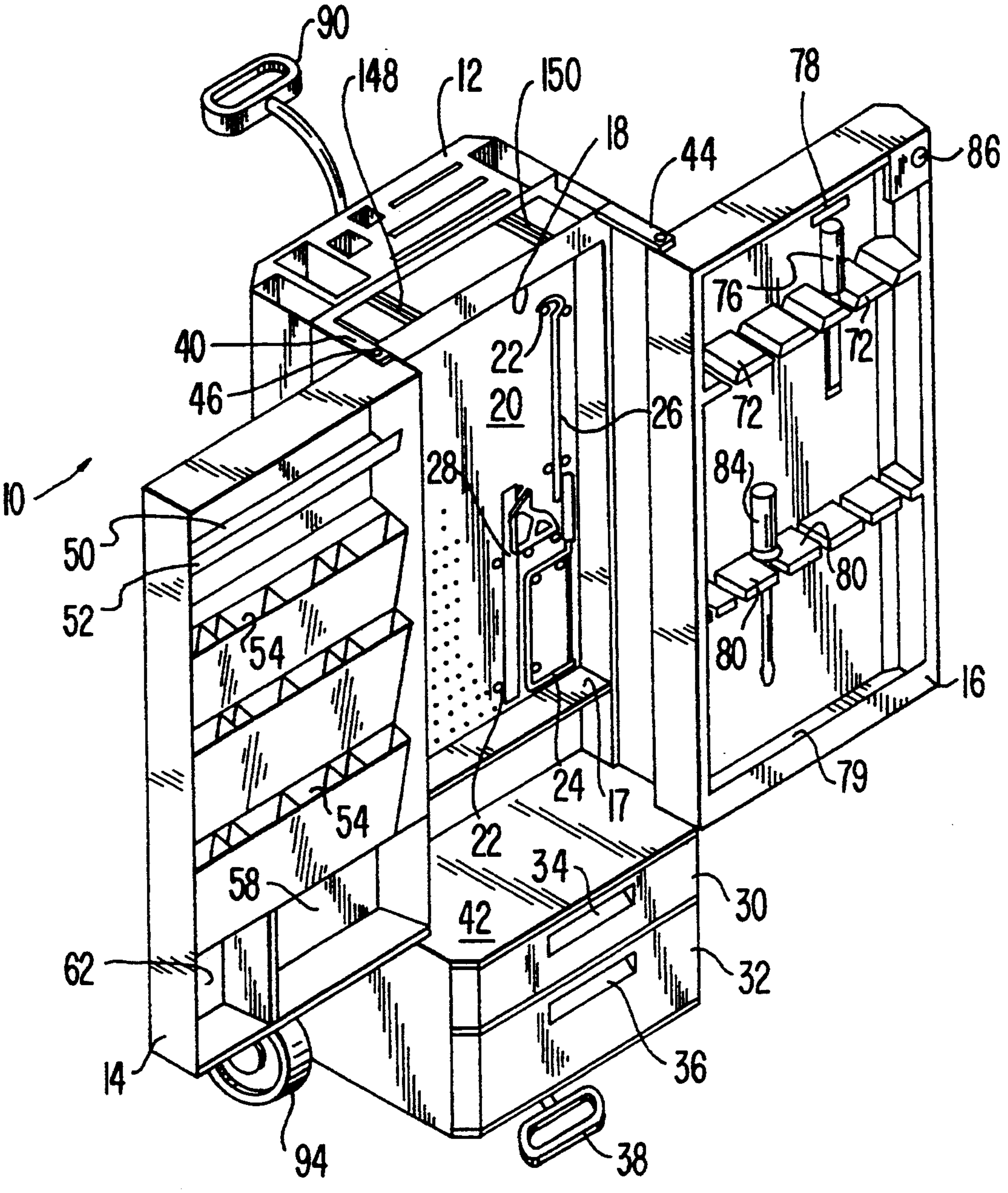
FIG. 1 is a perspective view of a tool truck constructed in accordance with the principles of the present invention, such view being taken from the front of the tool truck and showing the doors thereof in opened position.

FIG. 1 is a perspective view of a tool truck 10 constructed in accordance with the principles of the instant invention. Tool truck 10 comprises a body 12, a first door 14, and a second, or forward door, 16. Body 12 may be molded from a durable, hard, impact-resistant plastic, while the doors may be molded from a similar plastic or formed of sheet metal. A suitable, polycarbonate plastic is sold by the General Electric Company, under the trademark LEXAN.

Rectangular framework defines a chamber 18 in the forward face of body 12, and a pegboard 20 is secured within the chamber. Pegs 22 are pressed into openings in the pegboard and manual tools, such as coping saw 24, crowbar 26, and T-square 28, are retained within the chamber.

Drawers 30, 32 are located in the base of body 12. Hand pulls 34, 36 enable the drawers to be withdrawn from the base, when needed. A handle 38 projects, at approximately 45°, beyond the lower edge of body 12; the handle serves as a footrest to retain the tool truck in its vertical orientation. A first mounting post 40 projects horizontally from one forward corner of the tool truck. The post cooperates with the upper surface of door 14, which is secured between post 40 and ledge 42 on body 12. Door 14 is mounted for pivotal movement, through an arc of 180° between a closed position overlapping chamber 18, and an open position, exposing chamber 18. Door 14 is secured to the front left corner of body 12, as shown in FIG. 1.

A second mounting post 44 projects horizontally from the other forward corner of the tool truck; post 44 projects beyond post 40 by a distance equal to the thickness of door 14. Post 44 cooperates with the upper surface of door 16, which is secured between post 44 and edge 42 on body 12. Door 16 is mounted for pivotal movement, through an arc of 180°, between a closed position overlapping door 14, and an open position, exposing door 14. Door 16 is secured to the front right corner of body 12, as shown in FIG. 1, and pivots in the direction opposite to the movement of door 14.

Figure 18:
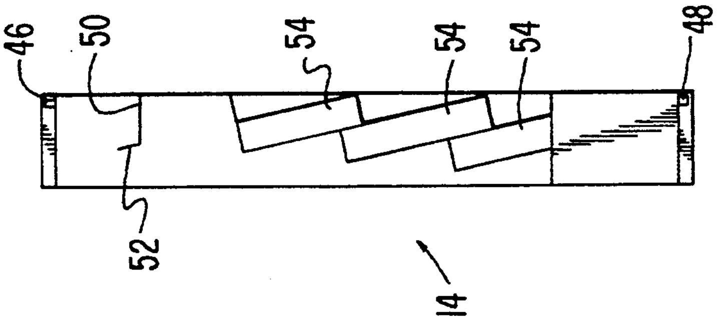
FIG. 18 is a top elevational view of the door shown in FIG. 17.
Figure 17:
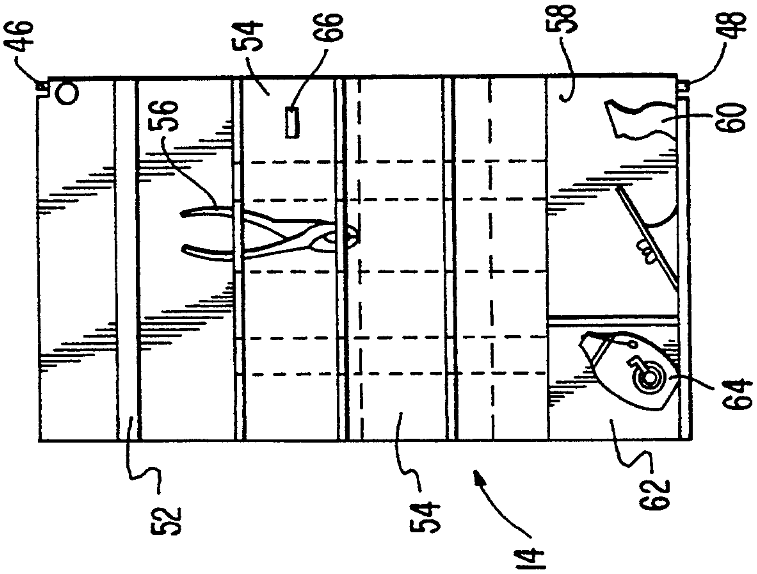
FIG. 17 is a front elevational view of the other door employed with the instant tool truck.

Door 14, as suggested in FIG. 1 and shown with greater clarity in the detailed views of FIGS. 17 and 18, has a stub shaft 46 situated in a recess at its upper right hand corner, and an aligned stub shaft 48 situated in a recess at its lower right hand corner. Shafts 46, 48 engage post 40 and ledge 42, and thus form a vertical axis about which door 14 is pivoted.

A shelf 50 with an upturned lip 52 is situated near the top of door 14. The shelf is intended to retain rasps, files, and the like. Several sets of rigid pockets 54 are defined below the shelf, and are adapted to receive pliers 56, razors, wrenches, torpedo levels, etc. A larger compartment 58 is formed at the lower right corner of door 14, and a block plane 60 may be stored therein. A smaller compartment 62 is formed at the lower left corner of door 14, and a chalk box 64 may be stored therein. Indentations 66 are formed on the faces of the pockets 54 to receive identifying labels for the tools to be associated with each pocket.

Figure 16:
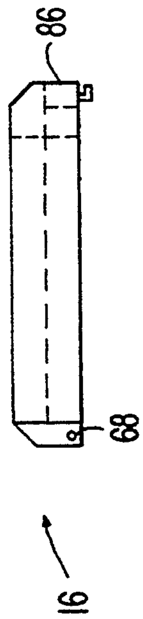
FIG. 16 is a top view of the door shown in FIG. 15.
Figure 15:
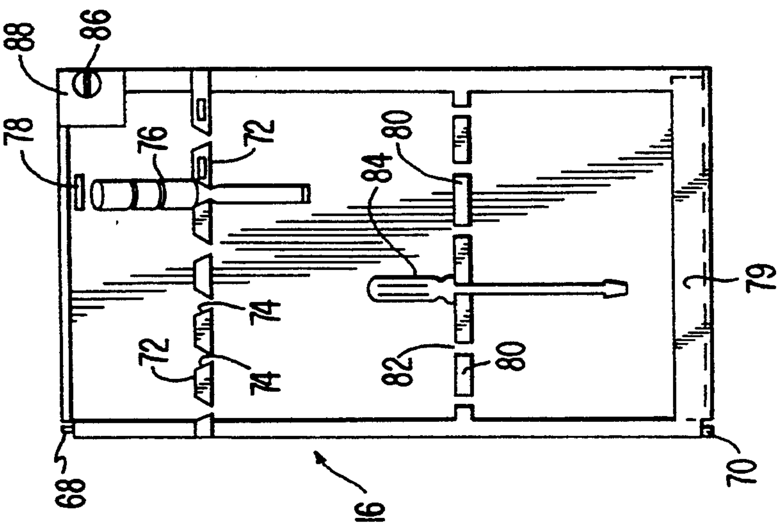
FIG. 15 is a front elevational view of one of the doors employed with the instant tool truck.

Door 16, as suggested in FIG. 1 and shown with greater clarity in the detailed views of FIGS. 15 and 16, has a stub shaft 68 situated in a recess at its upper left hand corner, and an aligned stub shaft 70 situated in a recess at its lower left hand corner. Stub shafts 68, 70 engage post 44 and ledge 42, and thus form a vertical axis about which door 16 is pivoted.

A plurality of spaced, tapered blocks 72 define slots 74 therebetween; a chisel 76 may be seated between adjacent blocks with the chisel blade extending downwardly. Labels 78 may be used to identify the chisel to be retained in each slot. A shelf 79 for files, and miscellaneous tools, is situated at the lower end of door 16.

A plurality of spaced, rectangular blocks 80 define slots 82 therebetween. A screwdriver 84 may be seated between adjacent blocks with the blade of the screwdriver extending downwardly. A key lock 86 is situated in a reinforced housing 88 at the upper corner of door 16. Door 16, when viewed from above, has tapered corners, to facilitate grasping of the tool truck, and handling same.

As shown in FIGS. 1–5, a second handle 90 is located at the rear of the tool truck; the handle includes a curved neck and terminates in a grip located above the upper end of the tool truck. A shaft extends transversely across the width of the tool truck at the lower rear corner thereof; wheels 94, 96 are secured to opposite ends of the shaft so that the tool truck may be moved easily from site to site. At repose, the tool truck rests upon handle 38 and wheels 94, 96, in a stable position, slanted slightly rearwardly.

Guideways 98,100, 102 and 104 are formed on the outer face of door 16. When door 16 is closed, it overlaps door 14 and prevents access to chamber 18 in the front face of body 12. The guideways are then exposed for use. Each guideway is open at one end to define an entry slot, and closed at the opposite end to function as a stop. The guideways are parallel to one another.

Figure 3:
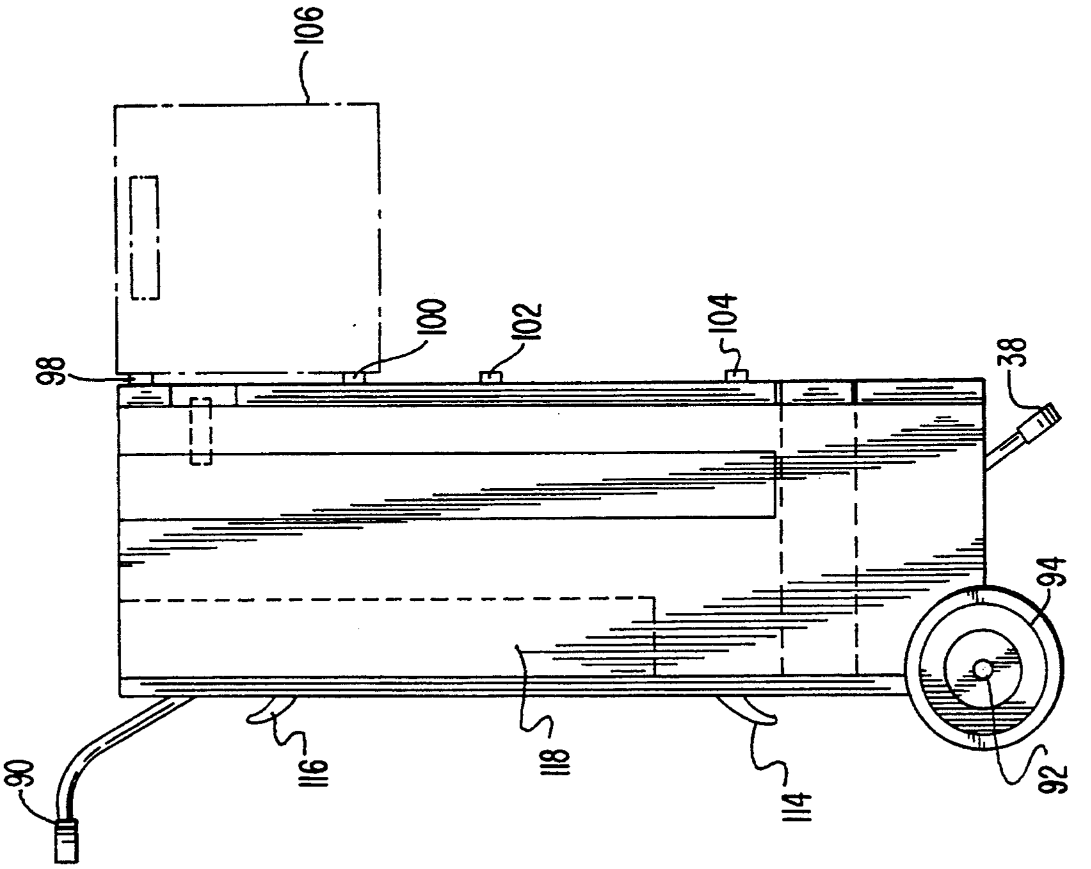
FIG. 3 is a right side view of the tool truck of FIG. 2, with a storage box secured thereto.
Figure 2:
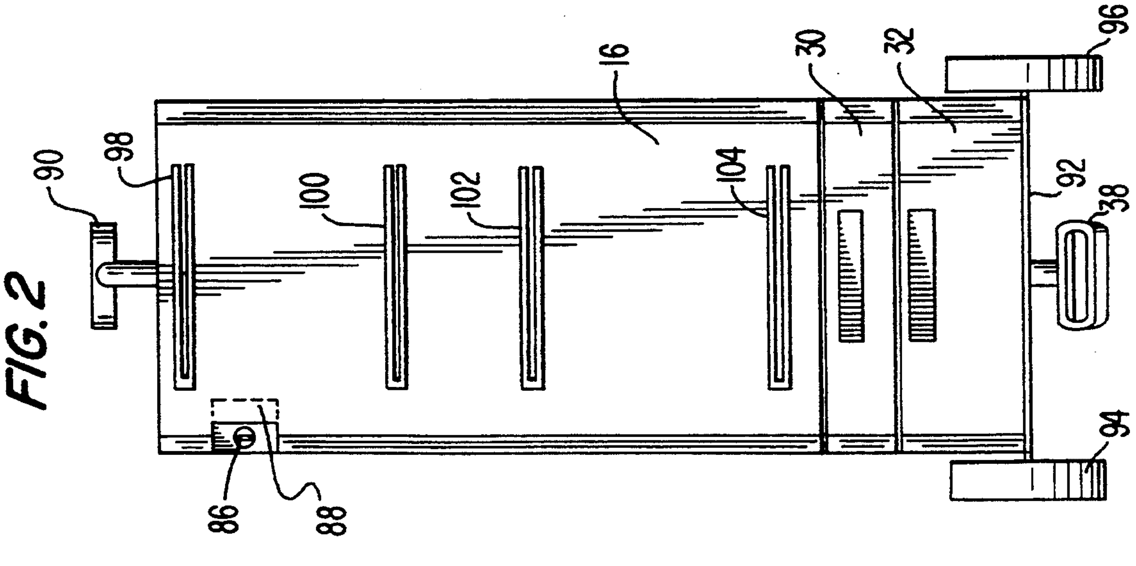
FIG. 2 is a front elevational view of the tool truck of FIG. 1, showing the guidways on the front of the tool truck.
Figure 19:
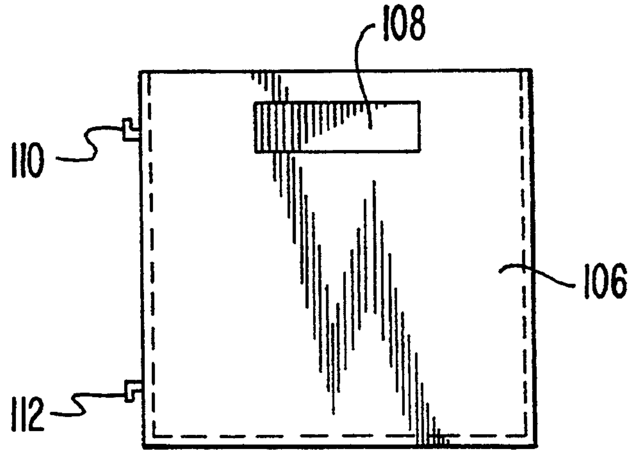
FIG. 19 is a side elevational view of a tool crate configured to be secured to the instant tool truck.
Figure 20:
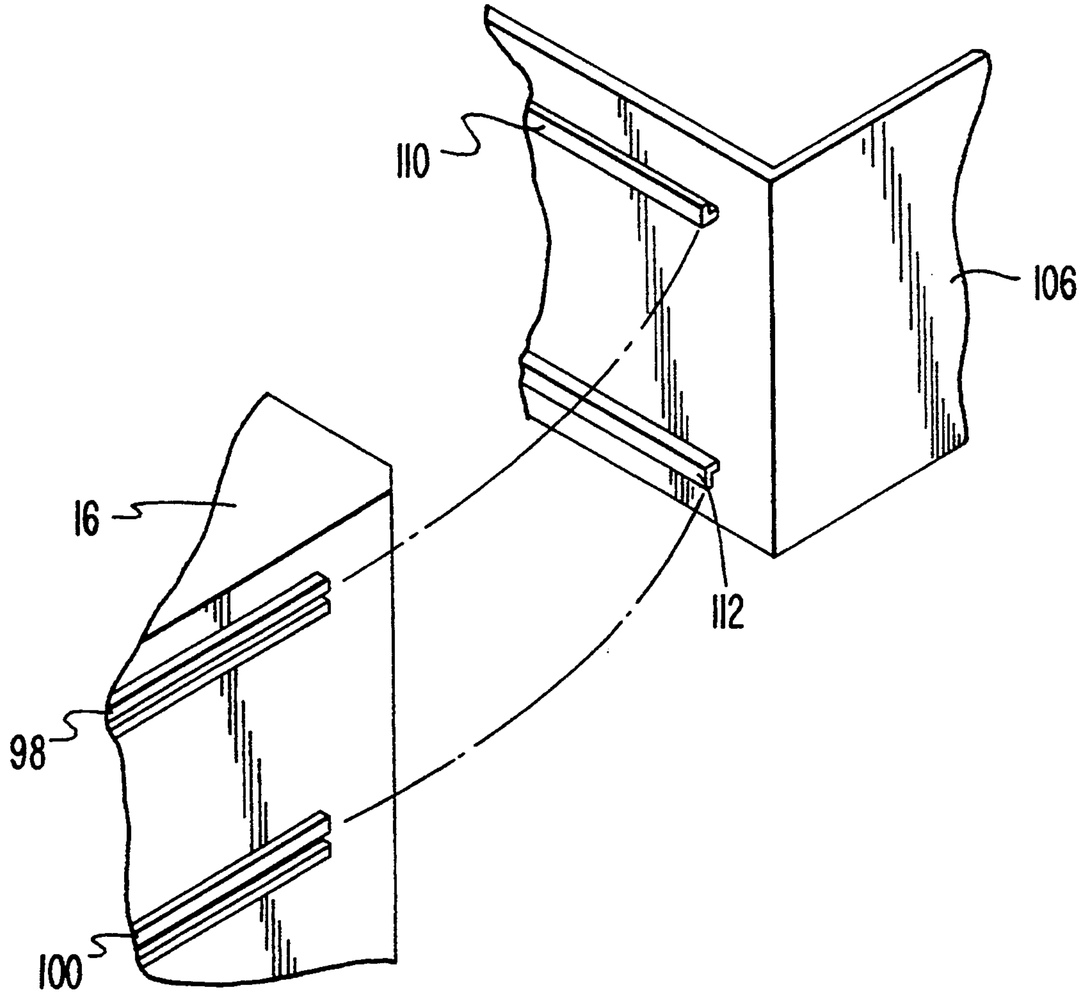
FIG. 20 is a fragmentary, perspective view showing the tool crate being secured to the instant tool truck.

The function served by guideways 98, 100, 102 and 104 will become apparent from an inspection of FIGS. 3, 19 and 20. A molded plastic crate 106, designed to accept power tools, is visible in dotted outline in FIG. 3 and is shown, in side elevation, in FIG. 19. Hand holds 108 are formed on the exterior of the end walls of crate 106 to facilitate lifting the crate. A first L-shaped hook 110 is situated below the upper edge of the side wall of each crate 106, and a second, L-shaped hook is situated above the lower edge of the side wall of each crate. The hooks are curved in opposite directions.

As shown in FIG. 20, when it is necessary, or even desirable, for the craftsman to transport power tools to the work site, the craftsman manipulates the crate so that hooks 110, 112, enter a pair of adjacent guideways, such as guideways 98, 100. If needed, two crates 106 can be secured to the front face to tool truck, one above the other.

Upper and lower stays 114, 116 on the rear surface of the tool truck enable power cords (not shown) to be wrapped thereabout. A rectangular slot 118, approximately two feet in length and opening upwardly through the top of the body of the tool truck, accepts a large level (not shown).

Figure 5:
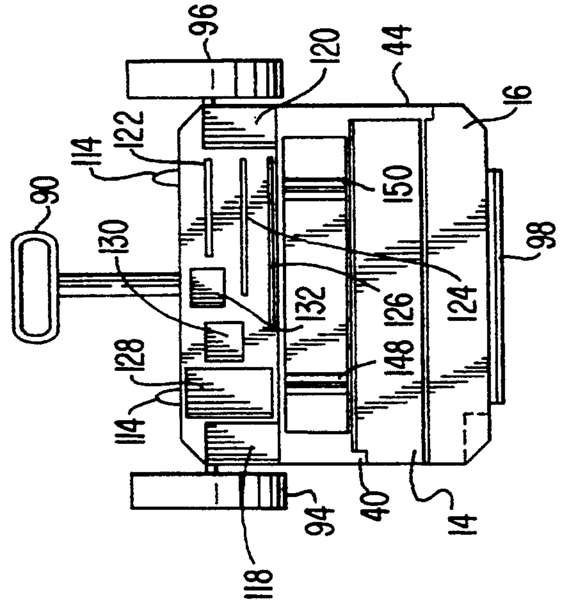
FIG. 5 is a top plan view of the tool truck of FIG. 2.
Figure 4:
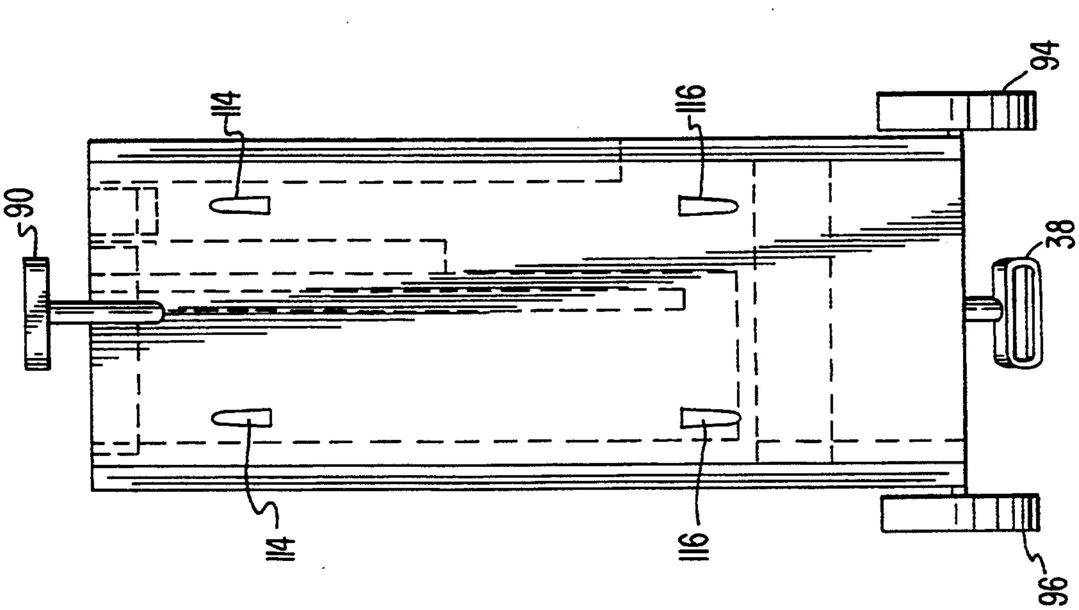
FIG. 4 is a rear view of the tool truck of FIG. 2.

FIG. 4 shows that two sets of stays 114, 116 may be provided on the rear face of the tool truck, while FIG. 5 shows that several additional slots are provided in the tool body to receive and retain numerous additional tools. To illustrate, FIG. 5 shows a rectangular slot 120 sized to receive a four foot level, and parallel grooves 122, 124, and 126 sized to receive different saw blades therein. Apertures 128, 130, 132 are configured to receive a tape measure, a hammer, a wrecking bar, etc. The overlapping arrangement of doors 14, 16 to seal off, and protect, compartment 18 within the front face of the body 16 of the tool truck, as shown in FIG. 5.

Figure 6:
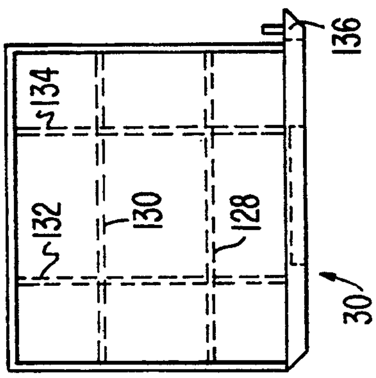
FIG. 6 is a top plan view of a drawer adapted to be inserted into the body of the tool truck.
Figure 7:
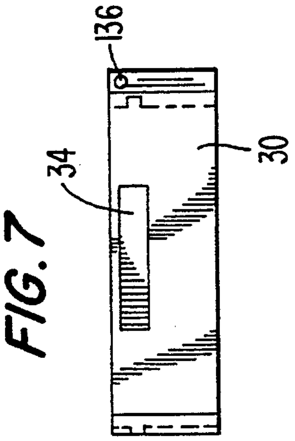
FIG. 7 is a front elevational view of the drawer of FIG. 6.

FIG. 6 is a top plan view of drawer 30 which fits into a complementary recess in the base of the body 16 of the tool truck. Drawer 30 may be divided, by interlocking slats 128, 130, 132 and 134, into a grid of nine compartments. Screws, nuts, bolts, and other hardware, may be stored within each compartment. A hand pull 34 is formed in the face of drawer 30, and a lock 136 is mounted in a flange at the front of the drawer. Drawer 32 is similar in configuration.

Figure 8:
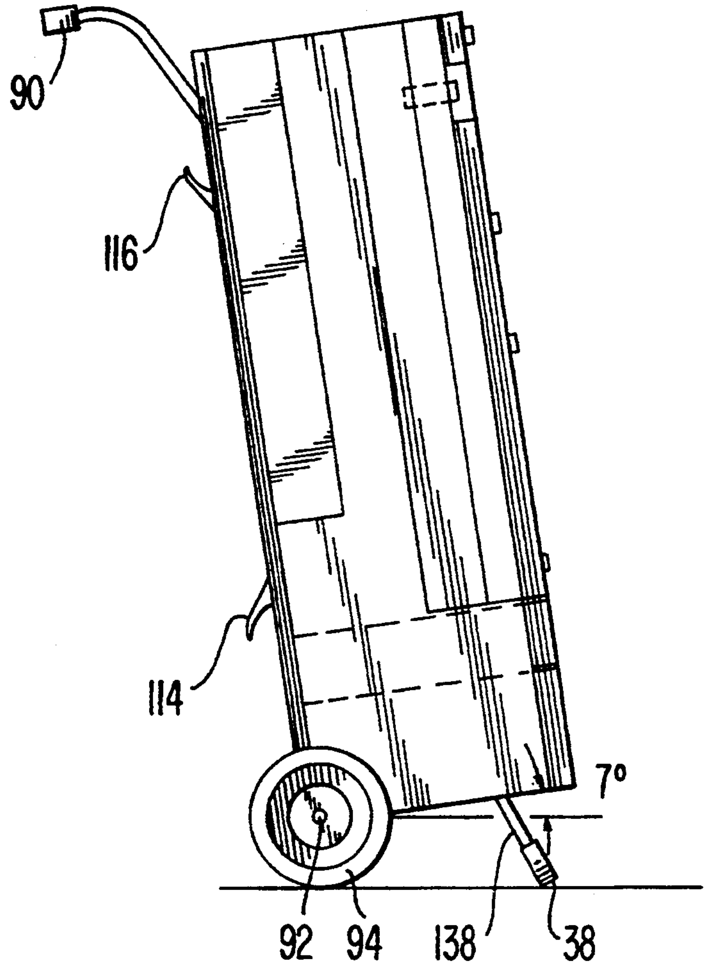
FIG. 8 is a right side elevational view of the tool truck of FIG. 2, on a reduced scale, to show the angular orientation of the tool truck at rest.

FIG. 8 shows tool truck 10 in a stable, position resting upon handle 38. The neck 138 of handle 38 is slanted at such an angle that the body tilts slightly backward. Elevating the bottom of the tool truck at an angle of approximately 7° above the horizontal has been found to be most satisfactory. The tool truck rests stably, yet can easily be tilted rearwardly about shaft 92 so that the truck can be pulled to a job site, with a minimum of effort, even in fully loaded condition.

Figure 9:
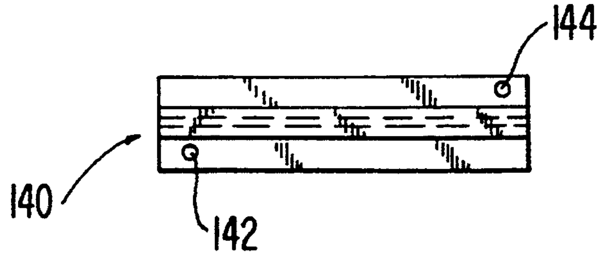
FIGS. 9 and 10 are detailed views of the radio track strip that is secured to the upper surface of the body of the tool truck.
Figure 10:
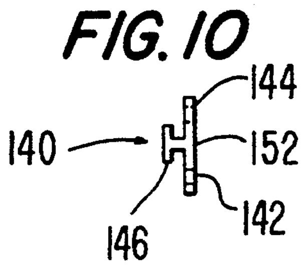

FIGS. 9 and 10 show details of the track strips 140 situated on top of the body of the tool truck. Each track strip is T-shaped in side elevation. Apertures 142, 144 permit screws to join each strip to the body of the tool truck. The smaller base 146 of each track strip is slipped into a raceway 148, 150 located atop the tool truck, as shown in FIGS. 1 and 5. The broader top 152 of each track is glued, bolted, or otherwise secured to the underside of a radio, or cordless phone (not shown) for the convenience of the craftsman.

Figure 13:
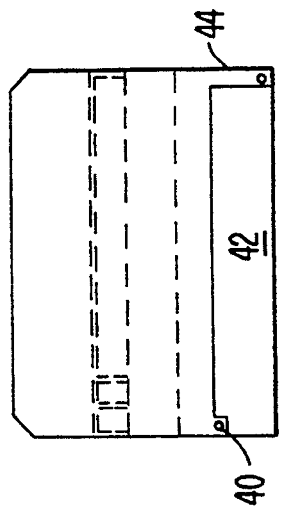
FIG. 13 is a top plan view of the body of the tool truck.
Figure 12:
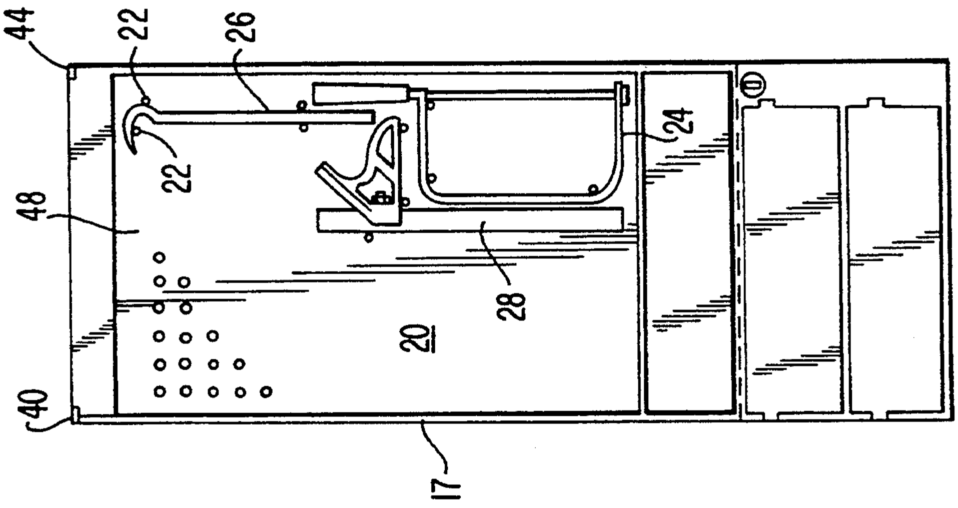
FIG. 12 is a front elevational view of the body of the tool truck.
Figure 11:
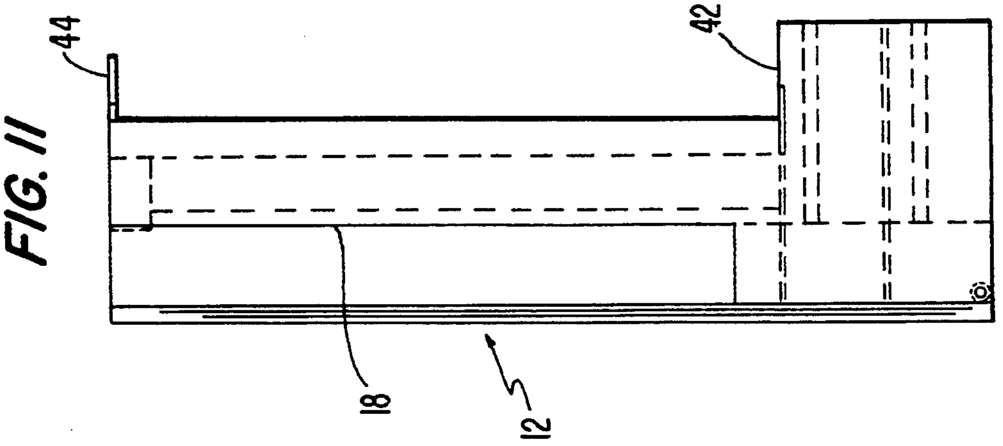
FIG. 11 is a right side elevational view of the body of the tool truck.

FIGS. 11–13 show the unique configuration of the body 12 of the instant tool truck. Such body lends itself to execution by molding durable plastic materials. Drawers 30 and 32 fit into complementary recesses in the base of body 12; slides may be formed on the sides of the drawers.

Figure 14:
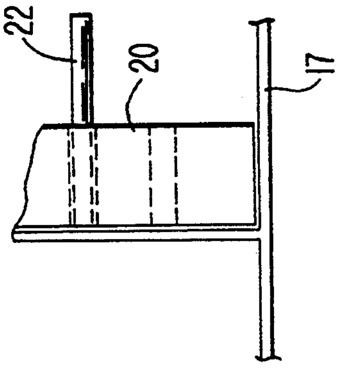
FIG. 14 is a fragmentary view, on an enlarged scale, of a compartment defined in the front face of the body, with a cooperating mounting hook, or peg.

FIG. 14 reveals that the rectangular framework 17 that defines compartment 18 at the front of body 12 is also formed by molding. Pegs 22 are slipped into apertures molded, or otherwise formed, in the pegboard.

The structural details of door 16 have already been discussed with reference to FIGS. 15 and 16. The structural details of door 14 have already been discussed with reference to FIGS. 17–18. The manner of securing crates 106 to the guideways on the front face of door 16 of the tool truck, as shown in FIGS. 19–20, has also been discussed at a prior juncture in the specification.

While the preferred embodiment of the instant portable tool truck has been described in detail, various modifications, refinements, and revisions, may occur to the skilled artisan. For example, although the major components of the tool truck, particularly the body and the doors, were designed for manufacture by molding same in plastic, certain components could be executed by known metal forming techniques. Also, in lieu of stub shafts at the upper and lower corners of each door, a unitary shaft could extend vertically through each door to enable pivotal movement thereabout. Consequently, the appended claims should be broadly construed in a manner consistent with the significant advance in the useful arts and sciences, and should not be limited to their exact terms.

I claim:

1. A portable tool truck for transporting a variety of tools in an organized manner such tool truck comprising:

a) a body including a front and a back, a top, a bottom, and spaced side walls, b) said body being formed as a unitary molding of durable, impact resistant plastic, c) a ledge extending toward the front of said body, but spaced above, and parallel to, the bottom of said body, d) a chamber situated between said ledge and the top of said body, and adapted to receive tools therein, e) a first door and a second door, said doors being equal in size, f) first mounting means defined between said first door and one side of said body for securing said first door for pivotal movement relative to said body, g) second mounting means defined between said second door and the opposite side of said body for securing said second door for pivotal movement relative to said body, h) said second door, when pivoted to its closed position, overlapping said first door and said compartment, i) said portable tool truck further including a forwardly extending base, said base being defined vertically between said ledge and said bottom and being defined horizontally between said spaced side walls, j) said base having recesses defined therein, and k) drawers are slidable within said recesses.

2. A portable tool truck for transporting a variety of tools in an organized manner, such tool truck comprising:

a) a body including a front and a back, a top, a bottom, and spaced side walls, b) said body being formed as a unitary molding of durable, impact resistant plastic, c) a ledge extending toward the front of said body, but spaced above, and parallel to, the bottom of said body, d) a chamber situated between said ledge and the top of said body, and adapted to receive tools therein, e) a first door and a second door, said doors being equal in size, f) first mounting means defined between said first door and one side of said body for securing said first door for pivotal movement relative to said body, g) second mounting means defined between said second door and the opposite side of said body for securing said second door for pivotal movement relative to said body, h) said second door, when pivoted to its closed position, overlapping said first door and said compartment, i) said portable tool truck further including several spaced guideways extending horizontally across the outer face of said second door, said guideways being adapted to receive plastic crates therein.

3. In combination, a portable tool truck as defined in claim 2 with plastic crates secured thereto, said plastic crates being generally rectangular in shape with an upwardly opening top, hooks spaced along one side wall of each of said crates, said hooks cooperatively engaging said guideways to temporarily secure said crates to said second door.

4. Plastic crates as defined in claim 3 wherein said hooks are L-shaped, and are reversely oriented to engage adjacent guideways and firmly support said crates.

* * * * *